US011747824B2

(12) United States Patent
Woods et al.

(10) Patent No.: US 11,747,824 B2
(45) Date of Patent: Sep. 5, 2023

(54) SYSTEMS AND METHODS FOR THREAT RESPONSE

(71) Applicant: THE AEROSPACE CORPORATION, El Segundo, CA (US)

(72) Inventors: Christopher P. Woods, Merritt Island, FL (US); David A. Ksienski, Los Angeles, CA (US); Kyle A. Logue, Westchester, CA (US); Donna Branchevsky, Mission Viejo, CA (US); Aidan R. Wilson, El Segundo, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 843 days.

(21) Appl. No.: 16/295,091

(22) Filed: Mar. 7, 2019

(65) Prior Publication Data
US 2020/0285249 A1 Sep. 10, 2020

(51) Int. Cl.
| | |
|---|---|
| *G05D 1/02* | (2020.01) |
| *G05D 1/00* | (2006.01) |
| *G01S 5/18* | (2006.01) |
| *G06F 16/783* | (2019.01) |
| *G01S 1/74* | (2006.01) |

(52) U.S. Cl.
CPC ............ *G05D 1/0255* (2013.01); *G01S 1/74* (2013.01); *G01S 5/18* (2013.01); *G05D 1/0088* (2013.01); *G06F 16/7834* (2019.01)

(58) Field of Classification Search
CPC ..... G01S 1/74; G01S 5/18; G01S 1/72; G01S 19/48; G01S 5/30; G05D 1/0088; G05D 1/0255; G05D 1/0246; G05D 1/0297; G05D 2201/0207; G05D 2201/0209; G06F 16/7834
See application file for complete search history.

(56) References Cited

U.S. PATENT DOCUMENTS

| | | | | |
|---|---|---|---|---|
| 5,202,661 | A * | 4/1993 | Everett, Jr. .......... | G08B 29/188 340/565 |
| 5,491,670 | A * | 2/1996 | Weber .................. | G05D 1/0255 367/128 |
| 8,930,044 | B1 * | 1/2015 | Peeters .................. | B64C 19/00 701/2 |
| 9,396,180 | B1 * | 7/2016 | Salvador .......... | H04N 21/44008 |

(Continued)

*Primary Examiner* — Daniel L Greene
(74) *Attorney, Agent, or Firm* — One LLP

(57) ABSTRACT

The disclosed threat response system(s) and method(s) provide a mean to secure an area around the clock. The system includes a plurality of microphones strategically located at various locations of the protected area, a plurality of acoustic beacons to provide navigational support one or more autonomous non-flying (ANF) drones, and a central controller. In one example each of the one or more ANF drones are equipped with an acoustic positioning system that uses beacon signals (e.g., mechanical waves) transmitted by the plurality of acoustic beacons to determine its position relative to the plurality of acoustic beacons. Once an acoustic event is detected, it is analyzed to determine whether there is a threat. When the threat is confirmed, the central controller dispatches one or more of the ANF drones to investigate and/or to engage the target.

18 Claims, 7 Drawing Sheets

(56) References Cited

U.S. PATENT DOCUMENTS

| | | | | |
|---|---|---|---|---|
| 9,689,958 | B1* | 6/2017 | Wild | G01S 1/751 |
| 2007/0223658 | A1* | 9/2007 | Moore | G06Q 10/00 |
| | | | | 379/37 |
| 2008/0271903 | A1* | 11/2008 | Lindstrom | A62C 35/02 |
| | | | | 169/61 |
| 2010/0226210 | A1* | 9/2010 | Kordis | G01S 5/0027 |
| | | | | 367/127 |
| 2015/0339913 | A1* | 11/2015 | Lyman | H04W 4/90 |
| | | | | 340/287 |
| 2016/0340006 | A1* | 11/2016 | Tang | B64C 39/024 |
| 2018/0158305 | A1* | 6/2018 | Noland | G08B 13/1672 |
| 2018/0165504 | A1* | 6/2018 | Kerzner | G06K 9/0063 |
| 2018/0322749 | A1* | 11/2018 | Kempel | G05D 1/0027 |
| 2019/0295207 | A1* | 9/2019 | Day | G09F 13/005 |
| 2020/0407058 | A1* | 12/2020 | Raz | B64D 47/00 |

\* cited by examiner

SYSTEMS AND METHODS FOR THREAT RESPONSE

FIELD OF THE INVENTION

Various aspects of the disclosure relate to a security system, in one aspect but not by way of limitation, to an autonomous threat response system.

BACKGROUND

Places of gathering (e.g., concerts, movie theaters, businesses) have been previous targets of violence and/or terrorism. Unfortunately, the rate of occurrence has not diminished and arguably has been consistent or even increasing. There are a couple of ways to secure these places of gathering. Security guards can be employed to protect an area such as school, a business, a movie theater. However, employing security guards can be very expensive and impractical. For example, it would be very expensive to place a security guard on every floor of an office building during business hours. It would be impractical to hire security guards for every floor and/or every business on a floor of the office building around the clock. Typically, an office building would have a couple of security guards stationed on the ground floor of the office building. However, the response time of the security guards can be very long if an event is to occur on the 28th floor of the office building, for example.

Another way to secure an area is to employ metal detectors at the exit and entrance points. However, metal detectors are unsightly and require staffs to operate. Metal detectors could also create anxiety to people within the area, which could ruin the atmosphere (e.g., look and feel, mood) of the occasion. Additionally, metal detectors cannot detect threats involving non-metal weapons or other emergencies such as assaults and medical emergencies. Accordingly, what is needed is a more versatile and inexpensive threat response system.

SUMMARY OF THE INVENTION

Disclosed herein are systems and methods for protecting an area and for responding to a threat. One of the systems comprises: a communication network; a first microphone and second microphone system communicatively coupled to the communication network; a first autonomous non-flying (ANF) drone communicatively coupled to the communication network, the first ANF drone and the first and second microphone systems are positioned at different locations of the protected area. The system also includes a threat response controller that is configured to: monitor an acoustic event coming from the protected area; using the first and second microphone systems and the third microphone, to determine an origin of the acoustic event using trilateration; determine a threat level of the acoustic event based on an audio profile of the acoustic event; and dispatch the first ANF drone to the origin of the acoustic event to investigate based on the determined threat level. The first microphone system can be positioned on a second ANF drone. The threat response controller is configured to dispatch one or more of the first and second ANF drones to investigate based on the determined threat level.

In the above system, the second microphone systems can be positioned on a third ANF drone, and the threat response controller is configured to dispatch one or more of the first, second, and third ANF drones to investigate. The ANF drone is configured to climb walls using a combination of wall-climbing wheels and rotors. The ANF drone can include one or more of a high luminance flashlight, an electrical shock device, and a disabling acoustic device. The threat response controller is configured to use one or more of the luminance flashlight, an electrical shock device, and a disabling acoustic device based on the determined threat level. The threat response controller can be remotely or centrally located or can be located on one of the ANF drones. The threat response controller is further configured to use an echo mitigation algorithm to increase the accuracy of detection of the origin of the acoustic event.

Where the protected space is a movie theater, the system can further include: a contextual threat determination module configured to monitor metadata of a movie to determine whether the acoustic event (e.g., scream, yell for help) is a real threat or an in-movie special effect.

The system can further include a plurality of acoustic beacons disposed at known locations in the protected area. Each of the beacons is configured to transmit distinct audio signals. Each ANF drone can determine its location with respect to the plurality of acoustic beacons based at least on the distinct audio signals. In some embodiments, the distinct audio signals can have a frequency outside of the human audible frequency (e.g., above 20 kHz).

Also disclosed herein is a method for monitoring a protected area and responding to a threat. The method comprises: monitoring sounds of the protected area using a first, second, and third microphone disposed at different locations of the protected area; detecting an acoustic event using one or more of the first, second, and third microphones; determining an origin of the acoustic event using trilateration of data from the first, second, and third microphones; determining a threat level of the acoustic event; and dispatching the first ANF drone to the origin of the acoustic event to investigate based on the threat level. Each of the first, second, and third microphones can be disposed on an ANF drone. The method can further include monitoring video feed of the protected area.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
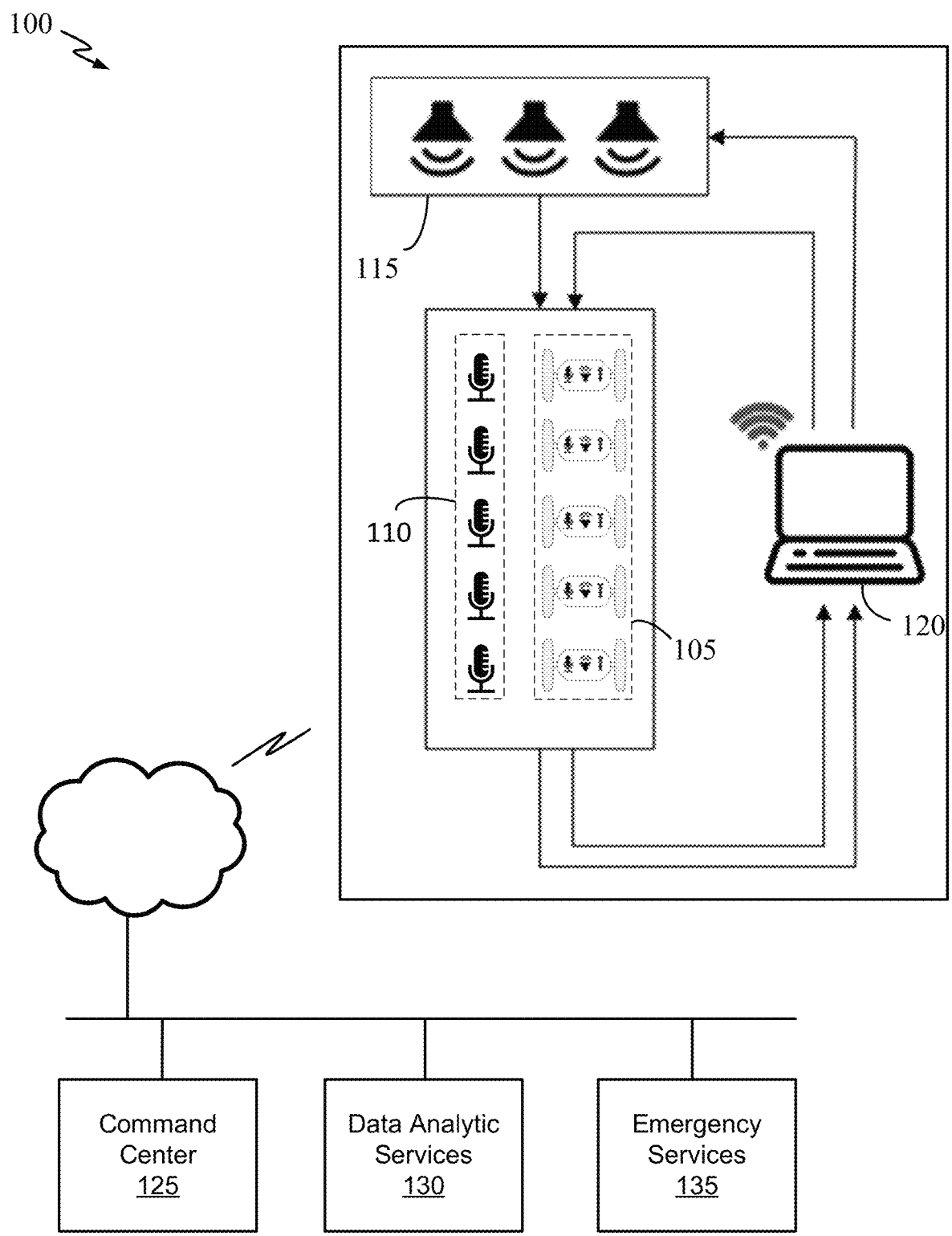
FIG. 1 is a system diagram of a threat response system in accordance with some embodiments of the present disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

The disclosed threat response system(s) and method(s) provide a mean to monitor an area (e.g., room, floor, theater, building, stadium) efficiently, safely, effectively and around the clock. The system uses a plurality of microphones strategically located at various locations of the protected area, a plurality of acoustic beacons to provide navigational support (also strategically located at various locations of the protected area), one or more autonomous non-flying (ANF) drones, and a central controller. The microphones, acoustic beacons, central controller, and ANF drones are communicatively coupled to each other using one or more wireless communication networks (e.g., Bluetooth, WiFi, near-field communication, 4G, 5G) to ensure continuing connectivity in the event of a power outage.

Each of plurality of microphones is strategically located to ensure most or all of the protected area is covered by multiple microphones such that an acoustic event occurring anywhere in the protected area can be located using trilateration. Each of the one or more ANF drones can be equipped with an acoustic positioning system that uses beacon signals (e.g., mechanical waves) transmitted by the plurality of acoustic beacons to determine its position relative to the plurality of acoustic beacons. Since the locations of the plurality of acoustic beacons are known within the protected area, an ANF drone can determine its position within the protected area based on trilateration of the beacon signals. In one scenario, a facility can have one ANF drone and several microphones. Once an acoustic event is detected, the ANF drone can be dispatched to the location of the acoustic event even if the origin location of the acoustic event is uncertain. In this way, the ANF drone can continue to monitor for subsequent acoustic event(s) to recalculate and fine tune the origin location of the acoustic event.

Once an acoustic event is detected, it can be analyzed to determine whether there is a threat. In some embodiments, the acoustic event can be relayed to central command where it can be reviewed by an operator for threat confirmation. The acoustic event can also be automatically analyzed using a threat assessment neural network trained to detect the level of threat based on the audio profile (e.g., features) of the acoustic event. The threat assessment neural network can be trained to detect gun shots, distressed voices (e.g., cries, screams), and other sounds such as request for help and muffled screams. The threat assessment neural network can classify an acoustic event as a threat or non-threat with a confidence of accuracy value (e.g., threat level). For example, a high confidence value of 80% or more can be classified as a high threat level. A 60-79% confidence value can be classified as a medium threat level. A 40-59% confidence value can be classified as low-medium threat level.

The central controller can dispatch one or more of the ANF drones based on threat level threshold, which can be set by the system administrator. In some embodiments, the central controller can be configured to dispatch one or more ANF drones when the threat level is medium or above. For socially high value locations such as schools and places of worship, the central controller can dispatch one or more ANF drones to investigate even when the threat level is low-medium or lower. The central controller can be located off premise, on premise, or can be integrated with one of the microphones, acoustic beacons, and/or distributed on one or more ANF drones. In some embodiments, the central controller can dispatch all ANF drones 105 of system 100 when a threat is detected.

Once an ANF drone is dispatched to the location of the acoustic event, the ANF drone can confirm the threat by relaying audio and/or video data to central command or by analyzing the new on-location audio and video data using a threat assessment neural network. If the threat is confirmed, the ANF drone and/or central controller can contact emergency services (e.g., building security guards, municipal emergency services) to request help. The ANF drone can also deploy target-disabling weapons (e.g., sonic gun, high intensity flashlight) at the target to disable and/or confuse the target and to bide time until help arrives. In some embodiments, once ANF drone 105 is dispatched, ANF drone 105 can stream audio and/or video data to central command and/or law enforcement. ANF drone 105 can also be dispatched in the harmless mode such that the target is distracted via interaction with ANF drone 105. ANF drone 105 can also be configured to move to a location that does not block or interfere with evacuation route during engagement with the target.

The disclosed threat response system uses ANF drones because they offer many advantages (e.g., power efficiency, stable foundation for surveying and threat response, cost effective, maneuverability, low key system) over flying drones. For example, when not dispatched, an ANF drone can be docked and constantly be in full charge. Acoustic monitoring of the protected area can also be done more accurately while the drone is not in motion. The ANF done can also be hidden while docked. For example, the ANF drone can be disguised as an overhead projector or public announcement speaker, etc. In this way, the ANF done can be esthetically pleasing. The ANF drone can also be hidden above a ceiling panel, behind a wall painting, under the floor, inside a furniture, for example. This enables the ANF drone to be unobtrusive while also being hard to locate, which can prevent sabotage by a would-be attacker.

In operation, the ANF drone can run along tracks surreptitiously placed well above eye-level along wall and/or ceilings. This enables the ANF drone to efficiently and quickly go the intended location without any obstacles. The ANF drone can also detach itself from the track to move around freely using wheels and/or rotors. The ANF drone can also be configured to climb walls and run on ceilings without the track by using its rotors and/or wall-climbing wheels to counteract gravity. Additionally, during a panic evacuation for the exit, the wall and/or ceiling climbing capable ANF drone can purposefully climb out of the way such that it does not impede with the evacuation. A flying drone on the other hand can pose a risk to people evacuating by being in the way and can frighten people. Flying drones can also pose potential risks to first responder by being in the way of flight paths. Lastly, it would be harder to aim and deploy target-disabling weapons (e.g., light, sonic weapons) accurately on a flying drone. Whereas, on an ANF drone, the platform is much more stable and the deployment of target-disabling weapons on the target can be much more accurate. In some embodiments, ANF drone 105 can be deployed in the harmless mode, which include not deploying any form of weapon.

Threat Response System & Method

FIG. 1 illustrates a system diagram of the threat response system 100 in accordance with some embodiments of the present disclosure. The core of system 100 includes one or more ANF drones 105, a plurality of microphones 110, a plurality of acoustic beacons 115, and a central controller 120. Depending upon the size and/or type of the protected area (e.g., office building, theatre), system 100 can have one ANF drone 105 or 10 ANF drones, each of which can have wheels and/or rotors to enable ANF drone 105 to move on the ground, walls, and ceilings. Each ANF drone 105 can include an onboard microphone, video camera, and one or more of target-disabling weapons (e.g., sonic and shock target-disabling weapons). The onboard microphone is configured to work with the plurality of microphones 110 to detect and locate the origin of an acoustic event. In some embodiments, a protected area can have at least 3 microphones, which can be a combination of one or more microphones 110 and one or more ANF drones 105. In some embodiments, all microphones of the protected area can be disposed on ANF drones 105. Each microphone of the protected area—including microphones integrated into ANF drones 105—is located at a known location. Where microphones are integrated into ANF drones, at least the initial location of the ANF drones 105 are known.

Central controller 120 can use audio data received at three or more microphones (e.g., microphones 110 and microphone on ANF drone 105) to determine the origin location of an acoustic event using trilateration. Central controller 120 can also send the audio data to one or more of command center 125 and data analytic services 130 for analysis. In some embodiments, central controller 120 can communicate with one or more components (e.g., ANF drones 105, microphones 110) of system 100 using ZeroMQ communication sockets. Central controller 120 can be centrally located or distributed among one or more ANF drones 105 of system 100. In this way, each ANF drone 105 can have its own distributed central controller, which is configured to work with various modules (e.g., module 220, 225, 230, 235 of FIG. 2) of ANF drone 105 to enable autonomous operation.

Command center 125 can be operated by a staff that can review the audio data of the acoustic event to help assist with the threat determination. Data analytic services 130 can include a threat assessment module (e.g., neural network) that is trained to ascertain the level of threat represented by the acoustic event. Command center 125 and data analytic services 130 can be located on premise or off premise. Audio and/or video data can also be used by law enforcement to develop a target-engagement strategy (e.g., entry location, type of equipment needed, size of engagement team).

The threat assessment module (not shown) can include one or more neural networks such as, but not limited to, a convolutional neural network (CNN), a recurrent neural network (RNN), a deep neural network, a faster R-CNN, and a mask R-CNN. In some embodiments, the threat assessment module can be part of central controller 120 or integrated with ANF 105. The threat assessment module can be trained to detect distressed voices, muffled voices, cries for help, yell for help, and other abnormal sounds. The training data can be a collection of recordings from municipal emergency database (e.g., 911 call recordings). Once trained, the threat assessment module can be used to monitor real-time audio to determine whether an acoustic event falls under any of the abnormal sounds such as distressed voices and muffled voices. The threat assessment module can also determine the existence of a threat by comparing the audio profile of the acoustic event against a database of audio profiles of screams and other abnormal sounds. The threat assessment module can also determine the existence of a threat by analyzing one or more features of the audio profile such as total intensity (e.g., amplitude of the sound). The threat assessment module can receive audio data via the network from central controller 120, which can receive the audio data from one or more of the microphones 110 and/or ANF drones 105.

System 100 can have three or more acoustic beacons 115 strategically located in the protected area to provide broad navigational coverage to ANF drones 105. For example, in an open room such as a theatre or a gym, only 3 acoustic beacons may be required. In a more complex environment with walls, hallways, and doors, many acoustic beacons (e.g., 5, 10, 20) can be employed to provide sufficient coverage in various areas (e.g., rooms, corners, hallways) of the protected area. In this way, regardless of where ANF drones 105 is located in the protected area, it can receive beacon signals from at least three acoustic beacons. Acoustic beacons 115 can be speakers integrated into the walls or ceiling of the protected room. The physical location of each acoustic beacon 115 is known to central controller 120. Each acoustic beacon 115 is configured to transmit a unique beacon signal (sound wave). For example, each acoustic beacon 115 can transmit on different frequencies, phases, and/or amplitudes. In this way, when ANF drone 105 receives a beacon signal from one of the acoustic beacons 115, ANF drone 105 can determine, using audio feature (e.g., phase, frequency) analysis, its distance with respect to acoustic beacons 115. With only one acoustic beacon, ANF drone 105 will only be able to tell its distance from a single location of the protected area. With three or more acoustic beacons 115, ANF drone 105 will be able to tell its exact location within the protected area. In some embodiments, acoustic beacons 115 can be placed at various heights within the protected area. The frequency of the acoustic beacons can be any frequency above 20 kHz, which is above the hearing threshold for humans.

Each of the components of system 100 (e.g., ANF drones 105, microphones 110, acoustic beacons 115, central controller 120) is communicatively coupled to each other using one or more communication networks such as WiFi, Bluetooth, and cellular (e.g., 4G, 5G).

Data analytic services 130 can provide services such as audio and video analytics that can perform voice recognition and object detection and recognition. Audio data from ANF drones 105 and/or microphones 110 can be transmitted to central controller 120, which then can forward the audio data to data analytic services 130 for analysis. System 100 can also include cameras (not shown) at various locations of the protected area. In some embodiments, ANF drones 105 can include onboard video camera that collects both audio and video data. Video data from fixed cameras and/or ANF drones 105 can also be sent to data analytic services 130 for analysis. As previously mentioned, data analytic services 130 can include threat assessment module (not shown) that can perform the audio and video analysis locally. Alternatively, data analytic services 130 can be provided by one or more third parties.

In FIG. 1, emergency services 135 can include locally stationed security guards, off-site third-party security services, and/or municipal emergency service (e.g., police, fire). Once a threat has been detected and confirmed, system 100 can contact emergency services 135 and request for help in addition to dispatching one or more ANF drones 105 to investigate and/or engage the threat.

Figure 2:
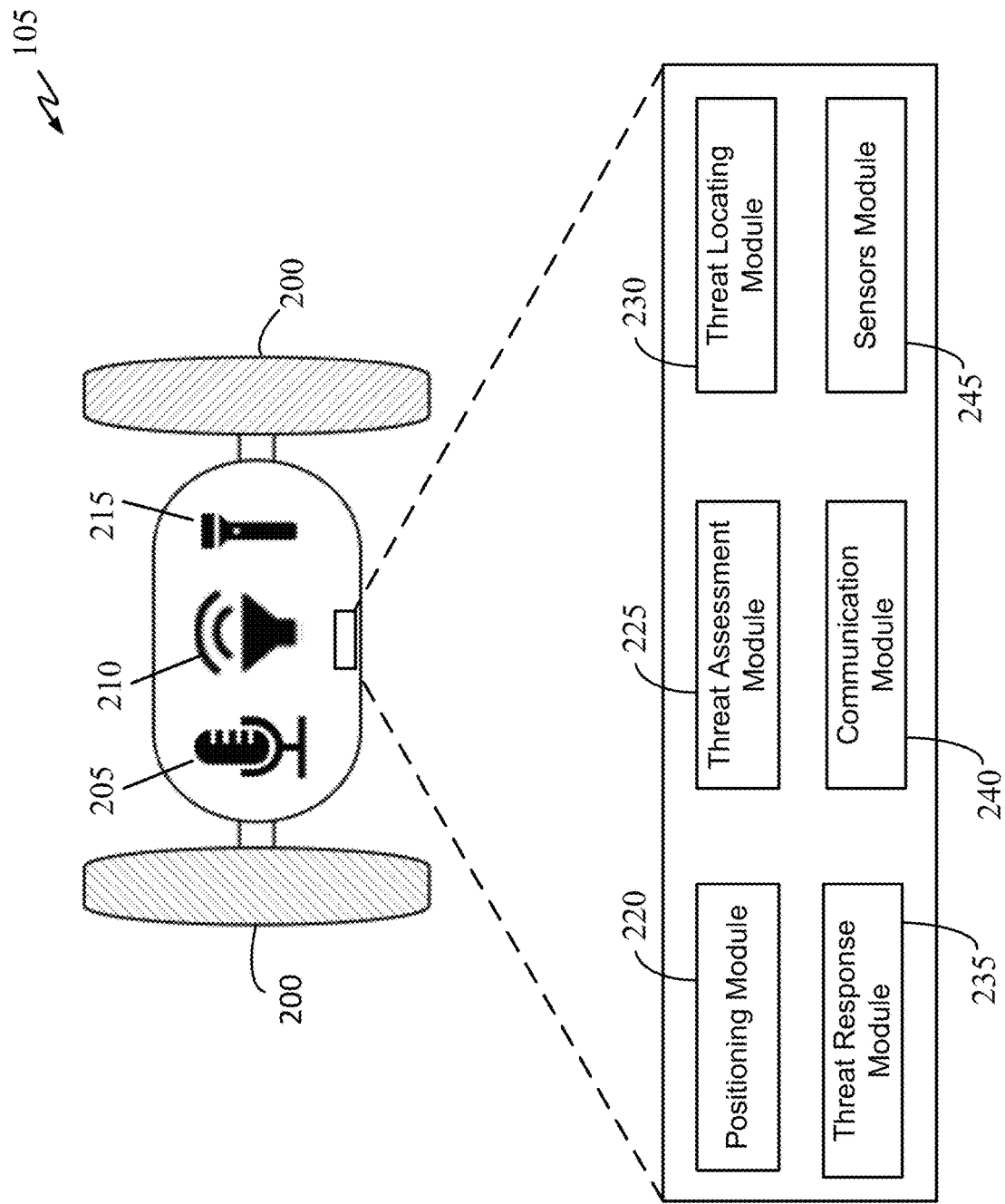
FIG. 2 illustrates an example drone in accordance with some embodiments of the present disclosure.

FIG. 2 illustrates an example ANF drone 105 in accordance with some embodiments of the present disclosure. ANF drone 105 includes locomotion mechanisms 200, a microphone 205, a sonic target-disabling weapon 210, a high intensity light source 215, a positioning module 220, a threat assessment module 225, a threat locating module 230, a threat response module 235, a communication module 240, and a distributed central controller (not shown).

Locomotion mechanisms 200 of ANF drone 105 can include one or more of wheels, rotors, arms, and grippers. In some embodiments, locomotion mechanism 200 can be a wheel capable of sticking to the side of a wall and top of the ceiling. The wheel of locomotion mechanism 200 can be configured to latch onto a track (disposed on walls and ceilings) to easily move along walls and ceiling. Alternatively, locomotion mechanism 200 can be a combination of wheels and rotors that enable ANF drone 105 to counter its weight while running on walls or ceilings. ANF drone 105 can also be configured to hover (using its rotors) for an extended period of time (if necessary) to get past a ground and wall obstacles when necessary. However, the main mode of motion for ANF drone 105 will be on the ground, walls or ceilings. In some embodiments, ANF drone 105 will only use its rotor(s) to move or stay at a fixed location on a wall or ceiling.

Microphone 205 is similar to microphone 110 and can share one or more functions of microphone 110. Microphone 205 can have two main functions. First, it can monitor beacon signals from the plurality of acoustic beacons and forward the beacon signals to positioning module 220 for analysis. Positioning module 220 is configured to analyze the beacon signals received from the plurality of acoustic beacons 115 to determine, using trilateration, the exact position of ANF drone 105 with respect to the protected area. Positioning module 220 can also include a database of echo profiles at various location of the protected area. In this way, positioning module 220 can mitigate echoes of beacon signals for specific location as ANF drone 105 moves from one location to another. For example, when ANF drone 105 is in room A, echoes of the beacon signals can be strong. However, with priori knowledge of echo profiles for room A, positioning module 220 can make appropriate acoustic compensation to the beacon signals and accurately determine the location of ANF drone 105.

The second function of microphone 205 is to monitor acoustic events emanating from the protected area. Once an acoustic event of interest is detected, the audio data of the acoustic event can be sent to threat assessment module 225 for threat determination. At the same time, the audio data can be sent to threat locating module 230 for analysis. Threat locating module 230 can analyze the time of arrival information of the audio data to ascertain its distance with respect to ANF drone 105. Threat locating module 230 can also request distance data generated by other microphones 110 in the protected area. Using the distance data from three or more microphones, threat locating module 230 can determine the origin location of the acoustic event using trilateration. In some embodiments, threat locating module 230 can use distance data calculated using time of arrival information from two or more different sets of three microphones. In this way, the origin location of the acoustic event can be accurately generated by comparing several results. In some embodiments, threat locating module 230 can also employ cameras (not shown) disposed in the protected area or on ANF drone 105. Video data can be used to confirm the location of the threat once the threat location information has been determined. Additionally, the live video can be streamed to command center 125 and/or sent to data analytic service 130 for video analysis using artificial intelligence (e.g., neural network).

ANF drone 105 can have one or more microphones 205. In some embodiments, ANF drone 105 can have three microphones 205 disposed at different locations on ANF drone 105. In this embodiment, threat assessment module 225 can find the location of an acoustic event (e.g., gunshot) using the three microphones 205 on ANF drone 105. In some embodiments, system 100 can have two or more ANF drones 105, each ANF drone 105 can also have two or more microphones 205. In this embodiment, threat assessment module 225 can find the location of an acoustic event using data from a combination of microphones 205 on the two or more ANF drones 105.

Threat assessment module 225 can include one or more functions of data analytic services 130. Threat assessment module can include one or more trained neural networks configured to analyze an acoustic event, received at microphone 205, and determine the threat level of the acoustic event. The threat level can be a measured of the confidence of accuracy of a threat classification made by the trained neural network. For example, threat assessment module 225 can detect gun shots, distressed voices, and other sounds such as request for help and muffled screams. The threat assessment module 225 can classify an acoustic event as a threat with a confidence of accuracy value. A high confidence of accuracy value can equate to the threat level being high, thus justifying the deployment of one or more ANF drones 105.

Threat assessment module 225 can include a contextual threat determination module that is configured to monitor contextual data such as time of day, current event, scheduled events, real-time event metadata, etc. For example, if it is the Fourth of July, the contextual threat determination module can take into accounts noises from fireworks and fire crackers. In this context, any detected acoustic event can be further analyzed (e.g., by a neural network) to help distinguish it from regular fireworks or fire crackers noises, for example. In an example of a movie theater, the contextual threat determination module can be coupled to the theater movie projection system and can analyze the soundtrack and/or metadata of the movie such that screams or other sound effects from the movie will not falsely trigger the system. However, in the same example, if a scream is detected, and the contextual threat determination module can determine that no in movie sound effects (e.g., scream) should have been detected during a specific time frame, then the contextual threat determination module can classify the acoustic event as a real theat.

Sonic target-disabling device (e.g., weapon) 210 can be configured to emit sounds that are extremely uncomfortable to the human. Sonic target-disabling device 210 can also be configured to emit sounds that can disable the target by rendering the target unconscious or immobilized. For example, sonic target-disabling device can emit sounds having over 130 dBA, which is the threshold of discomfort for most people. High intensity light source (e.g., flashlight) 215 can be a light source having very high lumen (e.g., above 2000 lumen). High intensity/luminance light source 215 can temporarily blind and confuse the target. When more than one ANF drones 105 are used, many light sources can be very confusing and blinding for the target.

In some embodiments, light source 215 can have a duty cycle of 5%. This can greatly reduce power consumption and increase the battery life of system 100. The brightness and frequency of the light source 215 being applied to the target can create confusion and/or disorientation so to disrupt the target from aiming and shooting a gun accurately at a target that is more than 10 ft away. ANF drone 105 can have two modes of engagement, a harmless mode and a harmful mode. In the harmless mode, ANF drone 105 will only deploy light source 215 and not other target-disabling device to distract and/or disorient the target. In this way, the target is not injured, incapacitated, or harmed in any way by ANF drone 105. The harmless mode enables system 100 to be deployed at a broad range of facilities such as, but not limited to, school and places of worship. In the harmful mode, system 100 can be deployed at military bases, banks, etc.

Threat response module 235 can be configured to control sonic target-disabling device 210 and light source 215 based on the threat assessment by threat assessment module 225. If a threat is perceived and the accuracy is high, threat response module 235 can automatically engage the target and use sonic device 210, light source 215, or both on the target. In some embodiments, threat response module 235 can request for a confirmation from command center 125 before deploying the target-disabling weapons. In some embodiments, if threat assessment module 225 detects a continuing threat and/or no confirmation has been received from command center 125, threat assessment module 225 can automatically engage the target by deploying the target-disabling weapons.

Communication module 240 can include various communication antennas to enable ANF drone 105 to communicate using communication networks such as Bluetooth, WiFi, baseband cellular frequencies (e.g., 3G, 4G, 5G), and GPS. Communication module 240 is configured to enable ANF drone 105 to directly or indirectly communicate with the plurality of microphones 110, the plurality of acoustic beacons 115, central controller 120, command center 125, data analytic services 130, and emergency services 135. Although ANF drone 105 will mainly operate indoor, ANF drone 105 can use GPS signal if it is on the top floor or a single floor building where GPS signals interference is low. Additionally, ANF drone 105 can operate outdoor if necessary (e.g., chase and follow target outside of a building) using GPS.

Sensors module 245 can include a plurality of sensors such as, but not limited to, a temperature sensor, an infrared sensor, a motion sensor, and an impact/shock sensor. Data from one or more of these sensors can be transmitted to central command 125 and/or to emergency services to help ascertain the threat and/or the current situation of the protected area. When there is no power, infrared and motion sensors can be used to determine the number of people and their relative locations in a dark (unlit) protected area. The impact/shock sensor can be used by ANF drone 105 to determine whether it is under direct attack and respond accordingly (e.g., activate sonic weapon). In one implementation, ANF drone 105 can have a minimum amount of components needed to enable navigation and target location determination. This allows ANF drone 105 to be made inexpensively. ANF drone 105 can also be made such that it is desirable to shoot at. In this way, the attention of the shooter is on ANF drone 105 and not on other nearby people.

In some embodiments, one or more modules (e.g., module 220, 225, 230, 235) of ANF drone 105 can be located on the cloud. For example, resources such as audio and/or video data and other data that enable threat assessment and navigation can be shared between various modules and central controller 120 on a remote server. This enables heavy computations to be done remotely (by a more powerful server/computer on the network). In this embodiment, ANF drone 105 can include its own controller (not shown) configured to communicate (via communication module 240) with one or more of the remotely located modules and central controller 120.

Figure 3:
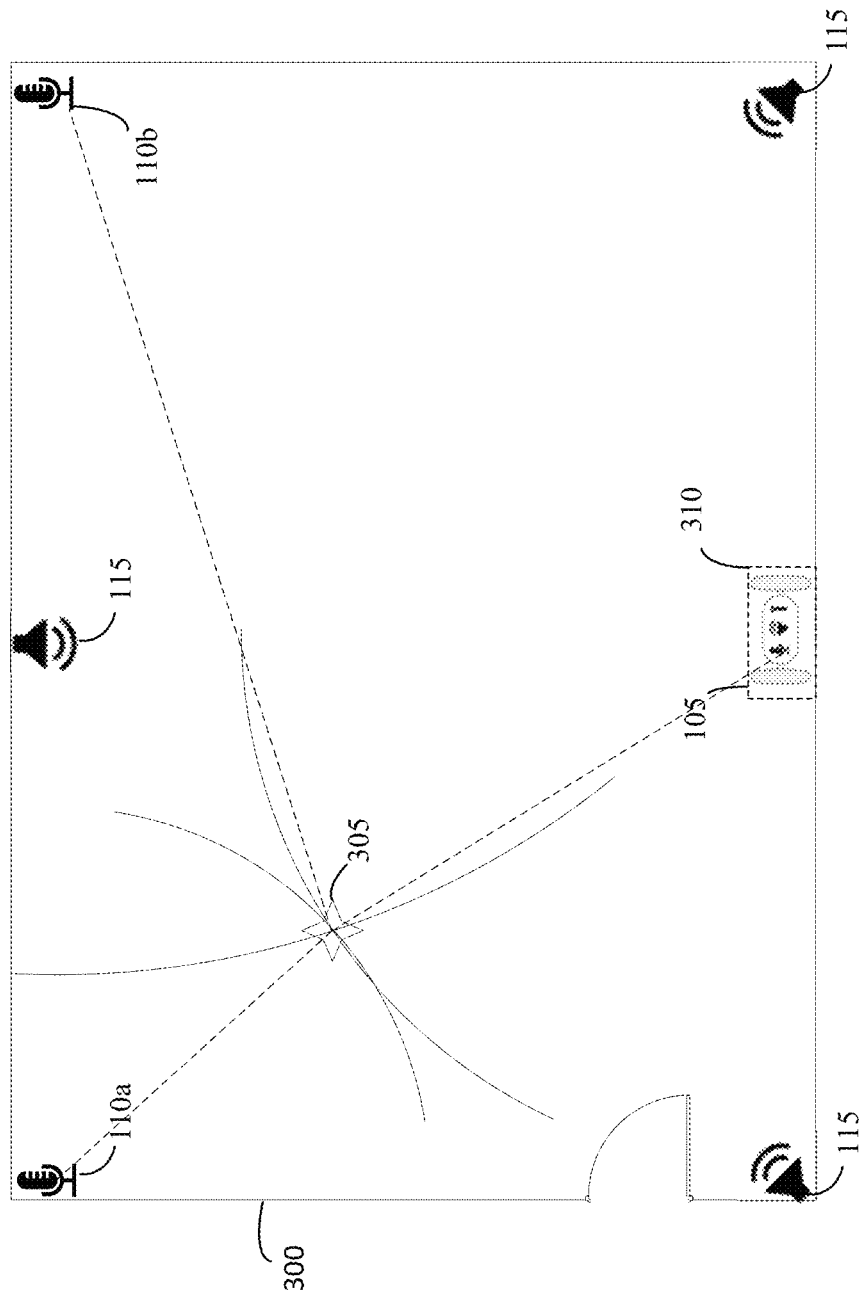
FIGS. 3, 4, and 5 illustrate example environments in which the threat response system of FIG. 1 can be implemented in accordance with some embodiments of the present disclosure.

FIG. 3 illustrates an example implementation of system 100 for a protected area 300 in accordance with some embodiments of the present disclosure. As shown, protected area 300 is protected by system 100 that includes ANF drone 105, two microphones 110, and three acoustic beacons 115. In this implementation, ANF drone 105 also function as one of the three microphones. ANF drone 105 can be hidden above the ceiling panel or can be placed in plain view for deterrent purposes. ANF drone 105 can also be equipped with a video camera that can be highly visible to people within protected area 300, which serves as an additional deterrent. Protected area 300 can be a business, a classroom, a gym, an office, a business, a theater, etc.

ANF drone 105 can be made with strong bulletproof and blunt force resistant materials. In some embodiments, ANF drone 105 can be configured to automatically deploy target-disabling weapons and/or contact emergency services 135 if it has experienced an attack such as, for example, a direct hit from a gunshot or a baseball bat. In this example, ANF drone 105 can use the impact/force sensor in sensors module 245 to monitor whether it is under attack.

To locate the origin location of acoustic event 305, the time of arrival (TOA) information of sound waves from acoustic event 305 can be calculated for each microphone in protected area 300. This includes microphones 110a, 110b, and the microphone on ANF drone 105. If there are more microphones available, additional TOA data can be calculated to increase the accuracy of pinpointing the origin location of acoustic event 305. ANF drone 105 is configured to know the location of home base 310. Once away from home base 310, ANF drone 105 can use beacon signals from the plurality of acoustic beacons 115 to determine its location with respect to home base 310 using trilateration. In some embodiments, home base 310 can include an acoustic beacon configured to emit beacon signals once ANF drone 105 leaves the home base.

Figure 4:
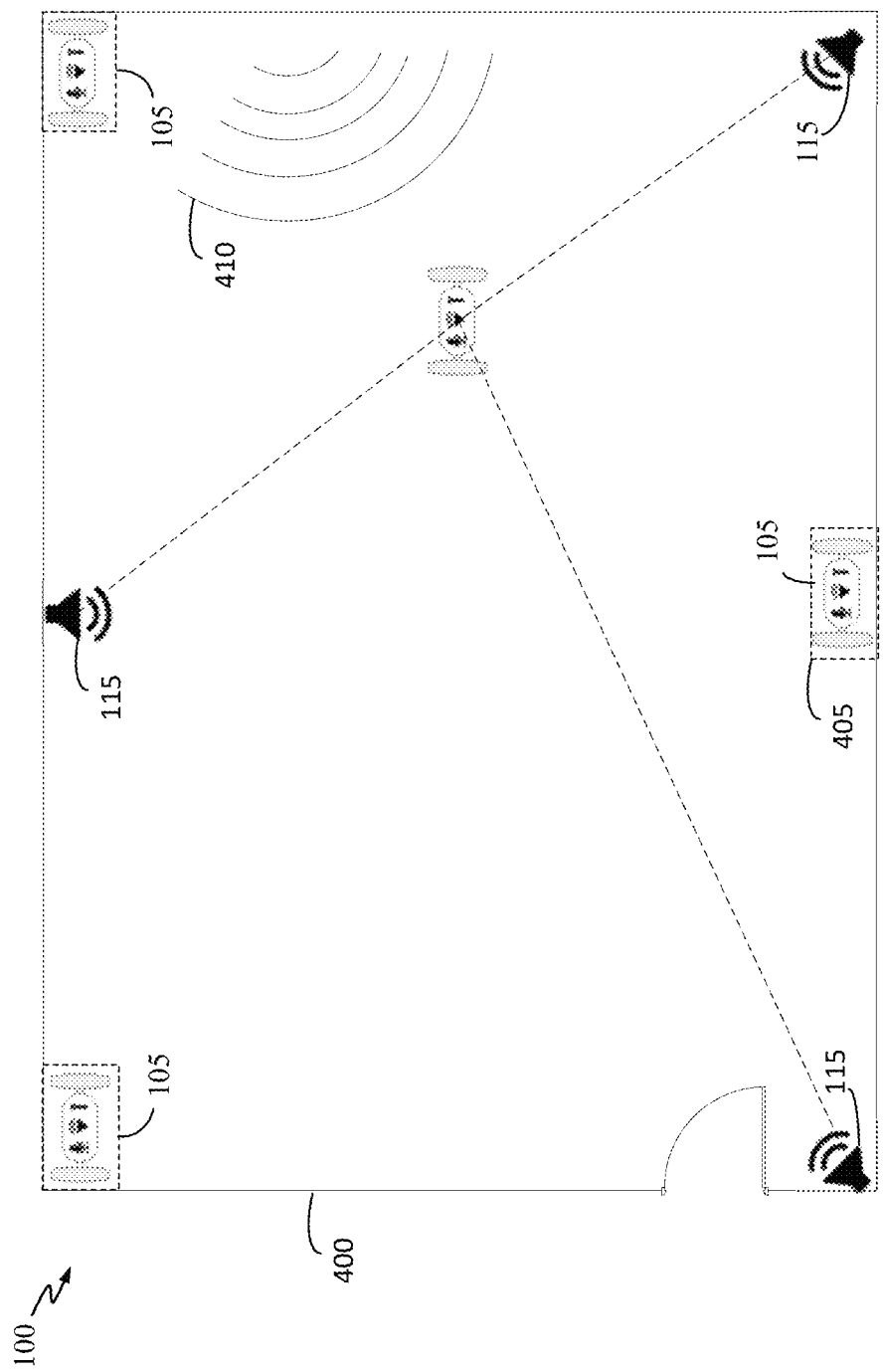

FIG. 4 illustrates an example implementation of system 100 for a protected area 400 in accordance with some embodiments of the present disclosure. For protected area 400, rather using a plurality of standalone microphones 110, system 100 can instead use three ANF drones 105, each with its own integrated microphone and/or video camera. Once ANF drone 105 is dispatched and away from home base 405, ANF drone 105 can accurately determine its location by trilaterating beacon signals from the plurality of acoustic beacons 115. ANF drone 105 can apply echo mitigation by identifying echo signals 410 and ignoring them using at phase analysis. Each acoustic beacon is configured to transmit a beacon signal with a distinct audio profile—having a certain frequency, wavelength, and period. After bouncing off one or more walls, echo signals 410 will arrive at ANF drone 105 with a different audio profile (e.g., different phase and/or frequency). Based on the changes in one of the sound waves reflected wavelength, period, and/or frequency, ANF drone 105 can be configured to ignore echo signals 410. In some embodiments, positioning module 220 of ANF drone 105 can contain a table of audio profiles of echo signals from various positions in protected area 400. Using the table of echo audio profiles, positioning module 220 can mitigate echo signals while ANF drone 105 is in motion. Positioning module 220 can include algorithms and instructions that, when executed by a processor, cause the processor to perform the function of location determination of ANF drone 105 as described above and with respect to FIG. 2.

Figure 5:
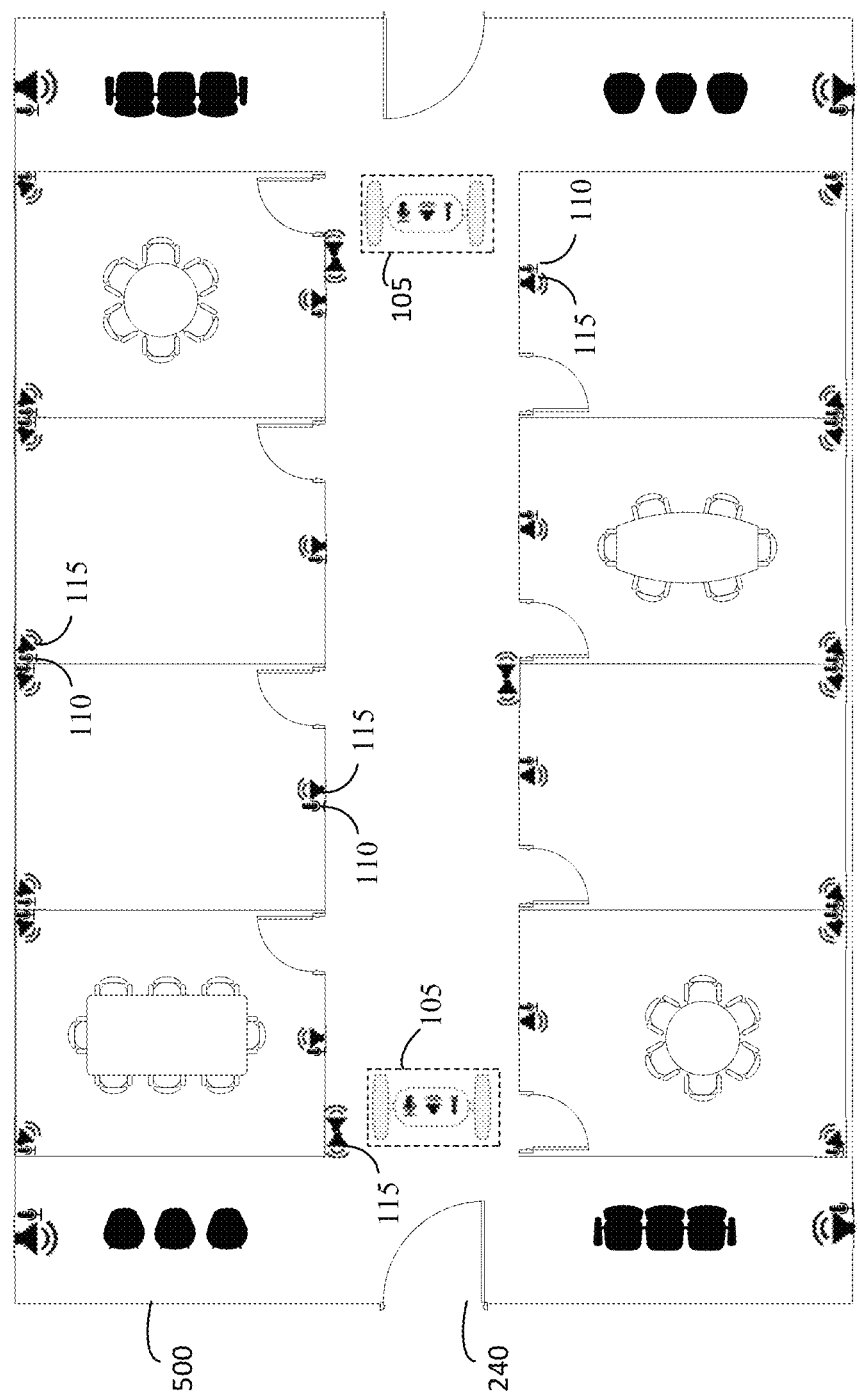

FIG. 5 illustrates an example implementation of system 100 in a complex environment 500 in accordance with some embodiments of the present disclosure. Environment 500 can include two exit-entrance doors and a plurality of office spaces. Environment 500 can have one or more ANF drones 105. In this example implementation, environment 500 has two ANF drones 105, each disposed near the exit-entrance door. Each ANF drone 105 can be hidden or can be placed in plain view for deterrent purposes. As shown, environment 500 includes a plurality of microphones 110 and acoustic beacons 115, both of which can be packaged together and installed at the same location. They can also be installed at separate locations. Each office space in environment 500 can include three or more microphones 110 and acoustic beacons 115. This enables central controller 120 and/or central command 125 to monitor each office space for any abnormal acoustic activity. System 100 can also include one or more cameras to enable video surveillance, which can be streamed to central command 125 and/or data analytic service 130 for analysis.

Environment 500 can include tracks (not shown) such as, but not limited, C-shape rails or magnetic rails along the ceilings and/or walls, which can be used to quickly guide one or more of ANF drones 105 to the origin location of an abnormal acoustic event. The tracks can run along the upper portion of the walls and/or the ceilings. Each wall within environment 500 can have an opening on near the floor or the ceiling to allow ANF drone 105 to freely travel between rooms. The tracks can also run through these openings on the floor or the ceiling. The tracks can also be configured to provide power to ANF drone 105.

In some embodiments, each door lock (not shown) and door opening-closing mechanism (not shown) of environment 500 can be networked and controllable by central controller 120 and/or central command 125. Upon detection of a legitimate (non-fire) threat, all doors can be closed and locked except for the exit-entrance doors and the door of the room where the threat is originated. In this way, occupants not in the same room of the threat can be locked and secured. In some embodiments, rooms located near the origin location of the threat are locked and rooms located far away from the origin location of the threat are not locked to enable evacuation.

Figure 6:
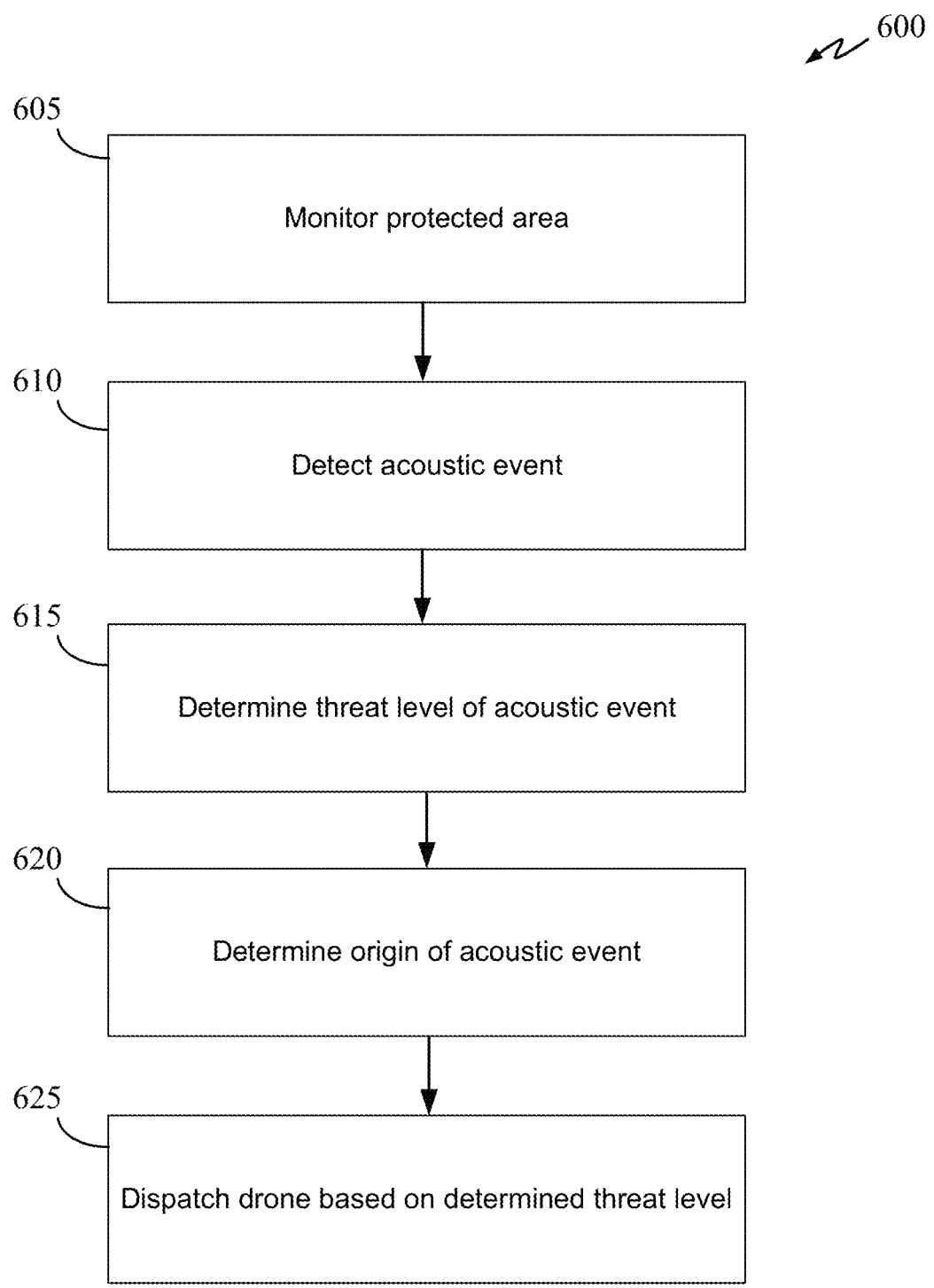
FIG. 6 is a flow chart illustrating a process for securing a protected area in accordance with some embodiments of the present disclosure.

FIG. 6 is a flow diagram illustrating a process 600 for securing a protected area using system 100 in accordance with some embodiments of the present disclosure. Process 600 starts at 605 where the protected area is monitored. The protected area can be monitored by a plurality of microphones 110 at fixed and known locations of the protected area. The protected area can also be monitored using a combination of microphones 110 and ANF drones 105 with integrated microphones. At 610 and 615, an acoustic event is detected, and the threat level of the detected acoustic event is determined. Typically, acoustic events (e.g., background noises, office noises, voices) occur all of the time in any given area. In this context, an acoustic event can be considered any sound that is a bit unusual for a given environment. An acoustic event can also be an event that detracts from a normal baseline of noises for the given environment. An unusual acoustic event that is worth further analysis and investigation can be an event such as, but not limited to, an acoustic event that is too loud, frequent, and unexpected. For example, gun shots are always unexpected in any given environment other than a firing range. Sounds of a person screaming, yelling, crying, requesting for help (e.g., "call 911") can be considered unusual acoustic events. In another example, any sound having a decibel reading over a certain decibel threshold can be categorized as an unusual sound. In some embodiments, a decibel threshold of 65 can be selected. Thus, any sound over 65 decibels will be investigated. The decibel reading of a typical busy office is approximately 60. The decibel threshold can be dynamically set based on time of day, scheduled events, current ambient noise, etc. In this way, false detections of an unusual acoustic event can be minimized. In some embodiments, threat assessment module 225 includes algorithms and instructions that, when executed by one or more processors, cause the one or more processors to perform the functions and features as described above with respect to threat assessment module 225 and sub-processes 610 and 615.

At 620, the origin location of the acoustic event is determined using acoustic data from the plurality of microphones 110 and/or one or more microphones of ANF drones 105. The origin location of the acoustic event can be determined using trilateration. In some embodiments, threat locating module 230 can include algorithms and instructions that, when executed by a processor, cause the processor to perform one or more functions of process 600 as described above and the function of locating the origin location of the threat as described with respect to FIG. 2.

At 625, one or more ANF drones 105 can be dispatched to the origin location based on the determined threat level at 615. If the threat has a confidence of accuracy that is above a predetermined confidence accuracy threshold, then central controller 120 can dispatch one or more ANF drones 105 to investigate and/or engage the threat. Prior to engaging the threat, ANF drone 105 can stream live audio and/or video feed to a command center (e.g., command center 125) for verification of the threat and/or to obtain explicit threat engagement instruction. For example, if the threat is determined to be a high-level threat and the command center has authorized engagement, ANF drone 105 can deploy one or more target-disabling weapons at the origin location of the threat or a new location if the threat has moved. In some embodiments, once the threat is confirmed, ANF drone 105 can use audio and/or video data to continuously track the movement of the threat. In some embodiments, a trained objection detection and recognition neural network can use video data from ANF drone 105 to track movements of the threat. Threat response module 235 can include algorithms and instructions that, when executed by a processor, cause the processor to perform one or more functions of process 600 as described above and the function of threat response as described with respect to FIG. 2.

Figure 7:
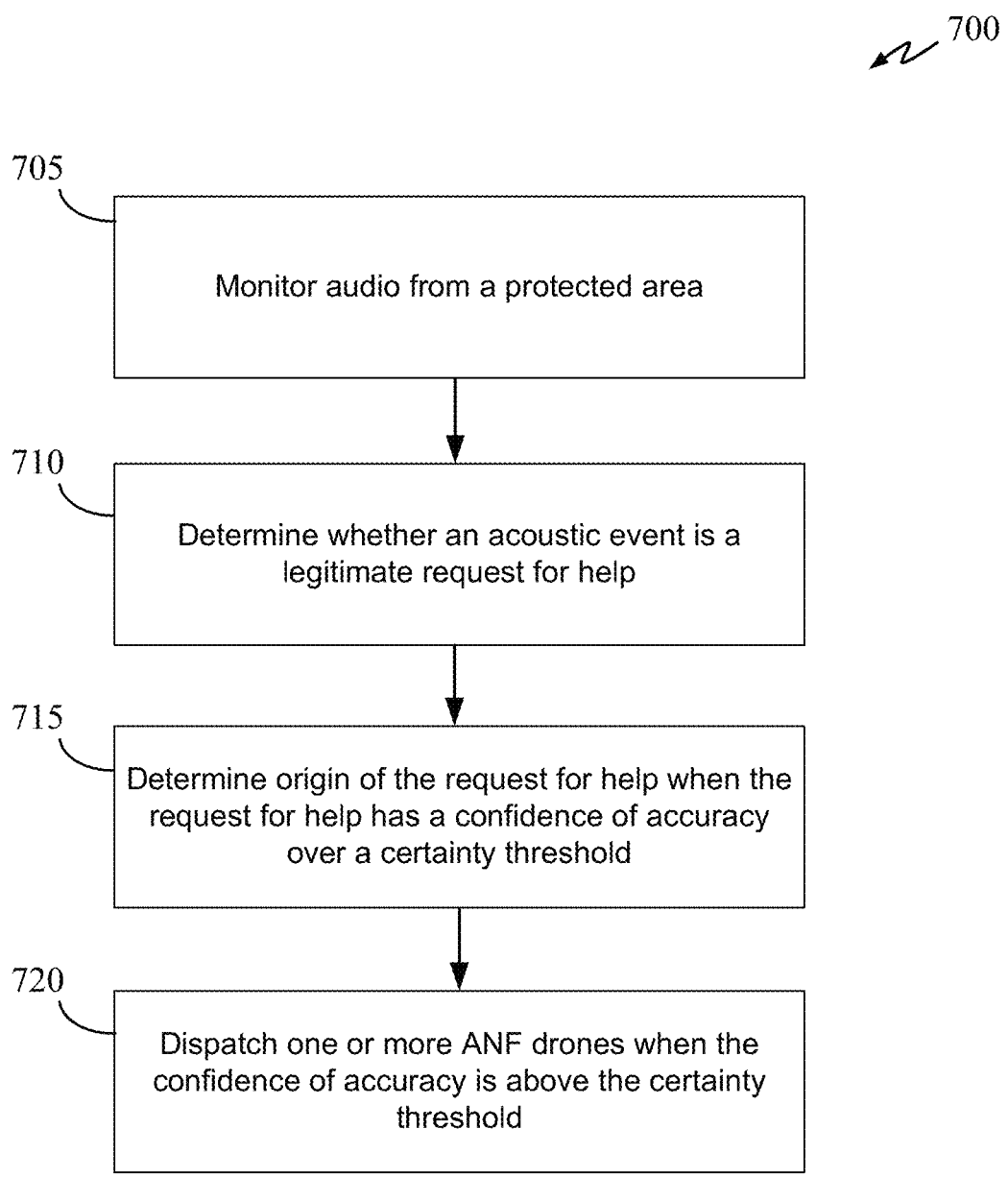
FIG. 7 is a flow chart illustrating a process for responding to an acoustic event in accordance with some embodiments of the present disclosure.

FIG. 7 is a flow diagram illustrating a process 700 for securing a protected area using system 100 in accordance with some embodiments of the present disclosure. Process 700 starts at 705 where a protected area is monitored using a plurality of microphones (e.g., microphones 110) for abnormal audio activities. In some embodiments, a baseline audio profile can be generated for the protected area. Sounds from the protected area can be continuously monitored and compared with the baseline audio profile to determine whether a triggering audio event (e.g., acoustic event) has occurred. An acoustic event can be, for example, an audio event where the sound intensity profile is above a certain decibel over the baseline audio profile. The baseline audio profile can be periodically updated throughout the day to adjust for noises that are inherent and/or normal to certain time of day or days of week.

At 710, an acoustic event is analyzed to determine whether a legitimate request for help (e.g., distressed call for help, distressed voice, muffled voice) is present. Audio of the acoustic event can be analyzed by a neural network (e.g., AI) trained to detect a legitimate request for help. In some embodiments, a distressed voice detection neural network can be used to detect a legitimate request for help. The distressed voice detection neural network can be a deep neural network (e.g., recurrent neural network), a CNN, etc. The distressed voice detection neural network can be trained using a data training data set having audio of real and/or simulated distressed voice (e.g., screams for help, cries for help, muffled voices, muffled screams, multiple people screaming, and panic). An acoustic event can be classified to be a legitimate request for help if the confidence of accuracy (generated by the distressed voice detection neural network) is above a certain accuracy threshold (e.g., 60%). In some embodiments, threat assessment module 225 can include algorithms and instructions that, when executed by a processor, cause the processor to perform one or more functions of process 700 as described above and the function of threat assessment as described with respect to FIG. 2.

Once a legitimate request for help is detected, process 700 can determine (at 715) the origin location of the request for help using trilateration of audio signals, from an acoustic event, received by a plurality of microphones (e.g., microphones 110). In some embodiments, threat locating module 230 can be configured to calculate and analyze a time of arrival information of the audio signals to ascertain the distances between the origin location of the audio signals and the plurality of microphones. In this way, the origin location of the acoustic event can be determined. In some embodiments, each ANF drone 105 can be equipped with video camera, which can provide live video feed to command center 125 and/or data analytic services 130. Command center 125 and/or data analytic services 130 can analyze the video feed to confirm, identify, and continuously track the location of the acoustic event (e.g., threat). In some embodiments, threat locating module 230 can include algorithms and instructions that, when executed by a processor, cause the processor to perform one or more functions of process 700 as described above and the function of threat identification and location determination as described with respect to FIG. 2. It should be noted that sub-processes 710 and 715 can be performed in a reverse order or in parallel. For example, the origin location of the acoustic event can be determined first and regardless of whether the acoustic event is a legitimate request for help.

At 720, one or more ANF drones 105 can be dispatched to the origin location to investigate and/or to engage the threat if the confidence of accuracy of the threat is above a certainty threshold. In some embodiments, threat response module 235 can be configured to automatically engage the threat by distracting the target (e.g., running into the target) and/or deploy one or more of the target-disabling weapons (e.g., sonic weapon 210, light 215, shock weapon). In some embodiments, if threat assessment module 225 detects a continuing threat and/or no confirmation has been received from command center 125, threat assessment module 225 can automatically engage the target by deploying one or more of the target-disabling weapons. In some embodiments, threat response module 235 can include algorithms and instructions that, when executed by a processor, cause the processor to perform one or more functions of sub-process 720 as described above and the function of threat response as described with respect to FIG. 2.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof.

Where a discrete value or range of values is set forth, it is noted that that value or range of values may be claimed more broadly than as a discrete number or range of numbers, unless indicated otherwise. For example, each value or range of values provided herein may be claimed as an approximation and this paragraph serves as antecedent basis and written support for the introduction of claims, at any time, that recite each such value or range of values as "approximately" that value, "approximately" that range of values, "about" that value, and/or "about" that range of values. Conversely, if a value or range of values is stated as an approximation or generalization, e.g., approximately X or about X, then that value or range of values can be claimed discretely without using such a broadening term. Those of skill in the art will readily understand the scope of those terms of approximation. Alternatively, each value set forth herein may be claimed as that value plus or minus 5%, and each lower limit of a range of values provided herein may be claimed as the lower limit of that range minus 5%, and each upper limit of a range of values provided herein may be claimed as the upper limit of that range plus 5%, and this paragraph serves as antecedent basis and written support for the introduction of claims, at any time, that recite those percentile variations.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In many instances where entities are described as being coupled to other entities, it should be understood that the terms "coupled" and "connected" (or any of their forms) are used interchangeably herein and, in both cases, are generic to the direct coupling of two entities (without any non-negligible intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

Additionally, as used herein and in the appended claims, the singular forms "a," "an," and "the" include plural referents unless the context clearly dictates otherwise.

The invention claimed is:

1. An autonomous threat response system, the system comprising:

a communication network;
a first microphone and second microphone system communicatively coupled to the communication network;
a first autonomous non-flying (ANF) drone communicatively coupled to the communication network, the first ANF drone and the first and second microphone systems are positioned at different locations of a protected area, wherein the first ANF drone comprises a third microphone; and
a threat response controller communicatively coupled to the communication network, the threat response controller configured to:
monitor an acoustic event coming from the protected area, using the first and second microphone systems and the third microphone, to determine an origin of the acoustic event using trilateration;
determine a threat level of the acoustic event based on an audio profile of the acoustic event;
dispatch the first ANF drone to the origin of the acoustic event to investigate based on the determined threat level and a predetermined social value of the origin of the acoustic event; and
a plurality of acoustic beacons disposed at known locations in the protected area, each of the beacons is configured to transmit distinct audio signals, wherein the first ANF drone is configured to determine its location with respect to the plurality of acoustic beacons based at least on the distinct audio signals.

2. The autonomous threat response system of claim 1, wherein the ANF drone is configured to climb walls.

3. The autonomous threat response system of claim 1, wherein the ANF drone comprises one or more of a high luminance flashlight and a disabling acoustic device, and wherein the threat response controller is configured to use one or more of the high luminance flashlight and the disabling acoustic device based on the determined threat level.

4. The autonomous threat response system of claim 1, wherein the threat response controller is centrally located and is configured to communicate with the ANF drone via wireless communication.

5. The autonomous threat response system of claim 1, wherein the threat response controller is located on the first ANF drone.

6. The autonomous threat response system of claim 1, wherein the threat response controller is further configured to use an echo mitigation algorithm to increase accuracy of detection of the origin of the acoustic event.

7. The autonomous threat response system of claim 1, wherein the protected space is a movie theater, and the system further comprising:
a contextual threat determination module configured to monitor metadata of a movie to determine whether the acoustic event is a real threat or an in-movie special effect.

8. The autonomous threat response system of claim 1, wherein the each one of the plurality of acoustic beacons transmits on at least one of a different frequency, a different phase, and a different amplitude.

9. The autonomous threat response system of claim 1, wherein the first microphone system is positioned on a second ANF drone, and wherein the threat response controller is configured to dispatch one or more of the first and second ANF drones to investigate.

10. The autonomous threat response system of claim 9, wherein the second microphone systems is positioned on a third ANF drone, and wherein the threat response controller is configured to dispatch one or more of the first, second, and third ANF drones to investigate.

11. A method for monitoring a protected area and responding to a threat, the method comprising: monitoring sounds of the protected area using a first, second, and third microphone disposed at different locations of the protected area, wherein the first microphone is disposed on a first autonomous non-flying (ANF) drone;
detecting an acoustic event using one or more of the first, second, and third microphones;
determining an origin of the acoustic event using trilateration of data from the first, second, and third microphones;
determining a threat level of an initial and successive acoustic events;
dispatching the first ANF drone to the origin of the acoustic event to investigate based on the threat level, wherein the origin of the acoustic event is iteratively updated based on successive acoustic events and based on a predetermined social value of the origin of the acoustic event;
receiving audio signals from a plurality of acoustic beacons disposed at known fixed locations in the protected area; and
determining the location of the first ANF drone based on at least the audio signals received from the plurality of acoustic beacons, wherein the audio signals comprises a frequency of over 20 kHz.

12. The method of claim 11, wherein the second microphone system is disposed on a second ANF drone, and wherein dispatching the first ANF drone comprises dispatching one or more of the first and second ANF drones to investigate.

13. The method of claim 11, wherein the third microphone systems is positioned on a third ANF drone, and wherein dispatching the first ANF drone comprises dispatching one or more of the first, second, and third ANF drones to investigate.

14. The method of claim 11, wherein the ANF drone is configured to transit along ceilings.

15. The method of claim 11, further comprising:
deploying one or more of a high luminance flashlight and a disabling acoustic device at the origin of the acoustic event based on the determined threat level.

16. The method of claim 11, further comprising using an echo mitigation algorithm to increase accuracy of detection of the origin of the acoustic event.

17. The method of claim 11, the method further comprising:
analyzing metadata of a movie to determine whether the acoustic event is a real threat or an in-movie special effect, wherein the protected area is a movie theater, and wherein metadata of the movie comprises soundtrack, subtitle, director notes, scene information.

18. A method for monitoring a protected area and responding to a threat, the method comprising:
monitoring audio from a protected area using a plurality of microphones disposed at different locations of the protected area;
determining, in-real time, whether the audio from the protected area, using a trained neural network, is a legitimate request for help;
determining an origin of the legitimate request for help using trilateration of data from the plurality of microphones when the legitimate request has a confidence of accuracy above a certainty threshold; and dispatching one or more autonomous non-flying (ANF) drones to the origin of the legitimate request for help when the confidence of accuracy is above the certainty threshold, and wherein the threshold is variable based on a predetermined social value of the origin of the legitimate request for help; and receiving beacon signals from a plurality of acoustic beacons disposed at known locations of the protected area;

determining the location of the one or more ANF drones based on at least the beacon signals received from the plurality of acoustic beacons, wherein the beacon signals comprises a frequency of over 20 kHz.

* * * * *